United States Patent [19]
Lilley et al.

[11] Patent Number: 4,667,781
[45] Date of Patent: May 26, 1987

[54] ELECTRIC BRAKE HEATER

[75] Inventors: Ronald C. Lilley, Cuyahoga Falls; Edgar J. Ruof, Akron, both of Ohio

[73] Assignee: Goodyear Aerospace Corporation, Akron, Ohio

[21] Appl. No.: 796,361

[22] Filed: Nov. 8, 1985

[51] Int. Cl.$^4$ ............................................. F16D 65/00
[52] U.S. Cl. ................................... 188/382; 219/201; 219/202; 244/111; 244/134 D
[58] Field of Search ................. 188/71.1, 71.5, 264 R, 188/382; 244/111, 134 D, 134 R; 219/201, 202

[56] References Cited

U.S. PATENT DOCUMENTS

| | | | |
|---|---|---|---|
| 2,269,019 | 3/1939 | Hall | 219/201 X |
| 2,632,083 | 3/1953 | Shaffer | 219/209 |
| 2,925,889 | 2/1960 | Albright | 188/382 X |
| 3,123,327 | 3/1964 | Padgett, Jr. | 244/134 D |
| 3,164,223 | 1/1965 | Kemp | 188/71.5 X |
| 3,402,280 | 9/1968 | Grigg | 219/209 |
| 3,509,316 | 4/1970 | Fresolo | 219/201 |
| 3,949,190 | 4/1976 | Landry | 219/385 |
| 3,951,240 | 4/1976 | Dowell et al. | 188/71.5 |
| 3,977,631 | 8/1976 | Jenny | 188/71.5 |
| 4,164,223 | 1/1965 | Kemp | 188/71.5 X |
| 4,195,714 | 4/1980 | Massing | 188/71.5 |
| 4,250,396 | 2/1981 | Moeller | 219/218 |
| 4,275,603 | 6/1981 | Kojocsay | 73/861.68 |

FOREIGN PATENT DOCUMENTS 1174499 11/1958 France .............................. 188/382

Primary Examiner—George E. A. Halvosa
Attorney, Agent, or Firm—R. J. Slattery, III; P. E. Milliken

[57] ABSTRACT

This invention provides for heating a brake assembly electrically to prevent it from freezing. More specifically this invention provides for heating electrically an aircraft multi-disk brake assembly.

An electric resistance heating element 12 is adapted to form a heater 10 to provide heating to a brake stack 44. Heat may be transferred either directly to the brake stack 44 or indirectly by first heating a member of the brake assembly 36. This member in turn transfers heat to the brake stack.

The heater 10 may be formed to fit within the cavity formed by a torque tube 26 wherein the heater abuts a substantial portion of the torque tube 26.

Signals from a thermocouple may be used for activation and deactivation of the heater 10.

9 Claims, 6 Drawing Figures

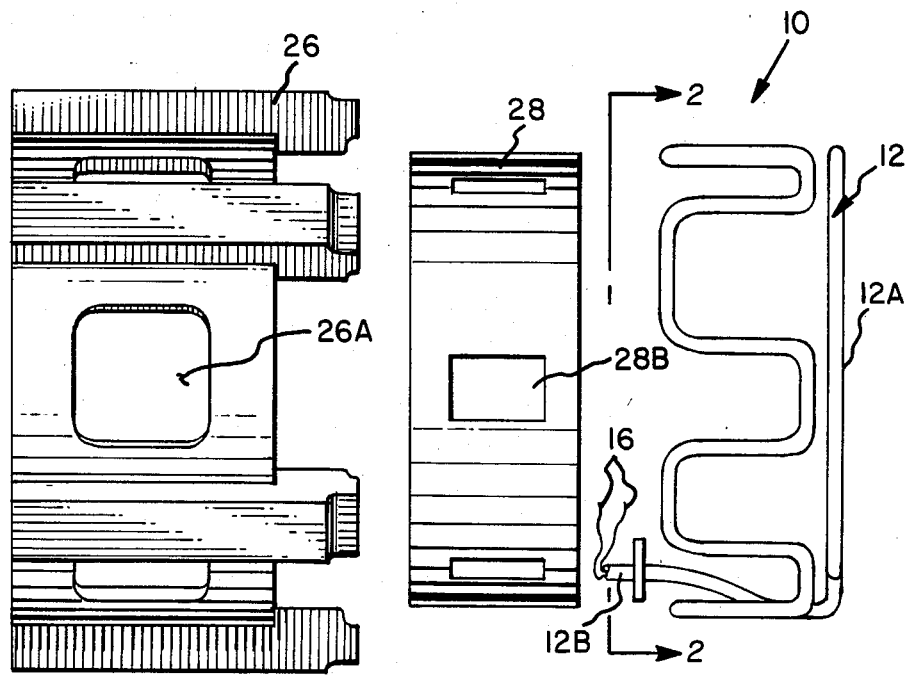
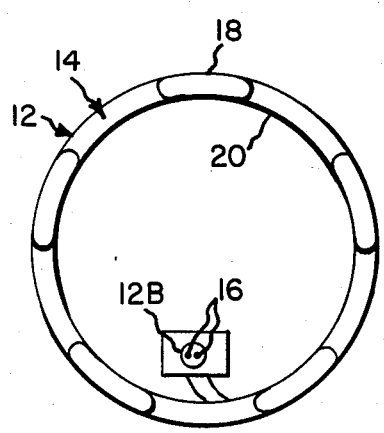
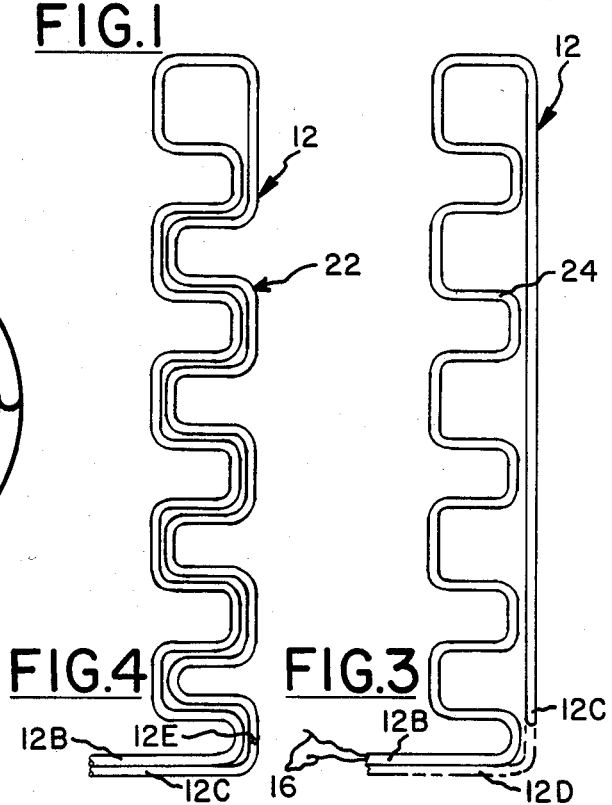
FIG.1
FIG.2  FIG.4  FIG.3

ELECTRIC BRAKE HEATER

BACKGROUND OF THE INVENTION

This invention provides an advancement in the art of brake design, such that a brake may be heated electrically thereby preventing it from freezing. More specifically this invention pertains to heating electrically an aircraft multi-disk brake assembly.

Problems of freezing brakes have become more noticeable with the increased used of carbon and composite carbon brake disks in place of steel disks. This problem arises more frequently with carbon than steel disks or friction members because of the differences in materials. Carbon being more porous than steel tends to absorb and hold more water, thus making carbon brakes more susceptible to freezing. The extremely cold temperatures experienced during high altitude flight may cause the rotating and the stationary disks in a carbon brake assembly to freeze their friction surfaces together, thereby locking the brake and causing the aircraft to go into a skid upon landing. With the brakes frozen in this manner the antiskid safeguards will not work, causing a very hazardous situation until the brakes can free themselves.

Currently some aircraft indirectly heat the landing gear assembly by bleeding off and ducting heat from the engine of the aircraft to the landing gear bay. This heat is then blown over the landing gear assembly. This invention eliminates the duct work and the heating of the whole landing gear assembly, while providing heat within the brake assembly itself to prevent the disks from freezing together.

BRIEF SUMMARY OF THE INVENTION

It is the purpose of this invention to prevent aircraft brakes from freezing, especially during high altitude or winter flights when temperatures may become extremely cold. This may be accomplished by electric resistance heating. One method is to provide heat to a member of the brake assembly such as the torque tube for transferring at least a portion of said heat to the brake stack thereby preventing the friction surfaces of the rotating and stationary disks from freezing. It is, therefore, our object:

- to provide an electric aircraft brake heater having an electric resistance heating conductor which will withstand the hazardous aircraft environment and yet provide heat to the brake stack to prevent freezing;
- to provide an electric heater for heating the rotating and stationary disks of a brake stack directly and/or heating indirectly a member of the brake assembly, such as the torque tube or back plate, which in turn transfers at least a portion of this heat to the brake stack, thereby preventing the rotating and stationary disks from freezing;
- to provide an electric aircraft brake heater comprising a resistance heating conductor, forming a hollow axially elongated cylinder, having an inside and an outside diameter, adapted to fit within the hollow portion of a torque tube such that the outside diameter engages a substantial portion of the inside surface of the torque tube;
- to provide an electric resistance heater which can be installed within the torque tube;
- to provide an electric heater which will keep the brakes above freezing while retracted in flight or inactivated, but will be deactivated upon the lowering of the landing gear, or upon actuation of the brakes or upon the brakes reaching a predetermined temperature;
- to provide an improved aircraft brake assembly having an electric heater therein to provide heating to a brake stack. The electric heater may first heat a member of the brake assembly, such as the torque tube or back plate, and then transfer at least a portion of this heat to the disks of the brake stack;
- to provide an aircraft brake assembly having an electric heater therein to provide indirect and/or direct heating of a brake stack, the heater being energized at a predetermined temperature during stowage or inactivated and deenergized at a different predetermined temperature or upon actuation of the brakes;
- to provide a method of heating an aircraft brake assembly including energizing, at a predetermined temperature an electric resistant element to generate heat, heating the torque tube assembly with the generated heat, and heating the brake stack by heat transfer from the element directly and/or heat transferred from the torque tube assembly, and deenergizing the electric resistance element at a predetermined temperature or other predetermined condition.

BRIEF DESCRIPTION OF THE DRAWINGS

The following is a brief description of the drawings in which like parts bear like reference numerals and in which.

FIG. 1 is an exploded view of an aircraft brake heater, torque tube and heat shield in accordance with this invention.

FIG. 2 is an elevation of the heater of FIG. 1.

FIG. 3 is a flat pattern of the heater shown in FIGS. 1 and 2.

FIG. 4 is an alternate embodiment of the heater as shown in a flat pattern in accordance with this invention.

DESCRIPTION OF THE INVENTION

Figure 5:
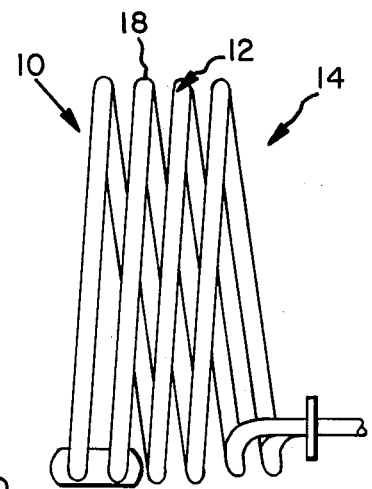
FIG. 5 is a side elevation of another embodiment of an electric brake heater in the form of a helix.

To produce an aircraft heater in accordance with the present invention a heating element having an electrical conductor such as resistance wire is used to provide heat to a brake assembly, more specifically to the friction members, the stationary and rotating disks of a brake stack. Such a conductor acting like a resistor, generates an output wattage per given unit of length, such as "x" watts per inch, when subjected to a voltage source. The wattage output is in the form of heat generation. It currently is impractical to place these conductors within the friction members because of the high temperatures they reach upon braking, their surfaces wear over a period of time, and they are not rigidly secured, but are subject to slidable movement within channels or keyways. However, an alternate means may be employed by locating the conductor to transfer heat directly to the brake disks and/or to first heat another member of the brake assembly, from which heat is transferred by thermal conduction, convection, or radiation to the brake disks. The torque tube assembly, including the torque tube and back plate, is a convenient intermediate member for transferring heat in this manner.

The electrical heater may be adapted to first provide heat to the torque tube. As the torque tube is heated, some of the heat will be transferred to the stationary disks or stators keyed thereto, thereby preventing them from freezing to the rotating disks or rotors. The rotors will also be heated by the transfer of heat from the torque tube and by direct contact with the stators. Furthermore, openings may be provided in the torque tube to allow for the direct transfer of heat from the heater to the disks.

The back plate of the torque tube may also house a heating element, however, this method by itself would require the heat to travel the entire length of the brake stack and/or torque tube assembly from only one end. More effective heat distribution, with a faster response time is achieved by heating a substantial portion of the entire length of the torque tube.

The torque tube may be heated by placing the heater within the hollow cavity formed by the torque tube. The heater then can be formed such that it abuts and covers a substantial portion of the inner surface of torque tube. The heating element may be arranged in spaced apart rows or may form a helix. The exact configuration of the heater is determined by several considerations. One is that the configuration must allow for the expansion and contraciton of the heating element. Another is that the configuration may have to allow for the heater to be compressed slightly and then return to its original size in order to be inserted within the torque tube. Also, the shape may have to allow for the passage of the torque tube bolts.

The heater must be able to withstand the harsh aircraft environment. As such, it must be able to withstand shock, vibration, pressure, sand, dust, various aircraft fluids and large changes in ambient temperatures without degradation of the unit. Therefor the electrical heating element may be further defined as an electrical conductor, sheathed over its entire length by an annular-shaped, axially elongated housing. One such sheathed element is a Calrod type, having one conductor within a rod like housing with the ends of the conductor extending from opposite ends of the housing. One manufacturer of a Calrod type element is Chromalox. Another is a cartridge type having a single looped conductor within a rod-like housing having one end closed and with both ends of the conductor terminating at the other end. An insulating material generally surrounds the conductors within the sheath. ARi Industries, Inc., manufactures a cartridge type element under their trademark "AEROROD" which is suitable for this purpose. This cartridge element has a stainless steel sheath, with a loop of nickel-chrome iron wire having a resistivity of 620 ohms-cmf at 20° C. (68° F.) with insulation of MgO.

The heater may be operated at a constant output wattage or it may be operated such that the wattage output varies as a function of temperature. However, a number of design limitations should be kept in mind. The heater should not be energized when the disks are thawed, such as above 32° F. (0° C.). This not only wastes energy, but also increases the ambient temperature of the wheel and brake assembly, such as the wheel fuse plugs. If the plane is required to perform an overload stop with the heater on, the fuse plugs may release due to their initially elevated temperature. Furthermore the heater should not be activated when the brakes are hot from use because high temperatures may result and damage the heater itself. The wattage output of the heater must be sufficient to thaw the brakes, but balanced such that the heating element temperature is kept below critical levels, such as the flash point of the hydraulic fluid. If the heating element is placed in contact with the inside diameter of the torque tube a heat shield should be positioned between the heating element and the wheel hub or axle.

A heat shield reflects heat toward the brake stack and away from the wheel hub or portions of the axle to prevent heating of these areas. Ventilation holes may be added to the heat shield to allow for cooling upon braking. The ventilation holes should not be in line with a heating element but should be in line with the holes of the torque tube to allow for the passage of air.

Now referring to FIGS. 1, 2, 3 and 4 there is illustrated a brake heater, shown generally as reference numeral 10 including a heating element 12 in accordance with this invention. To more clearly show the heater 10 of FIGS. 1 and 2, FIG. 3 illustrates the heater 10 as if laid out flat. FIG. 4 illustrates an alternate embodiment as if also laid out flat. The heating element 12 includes an electric resistance heating conductor within an annular-shaped housing 12A, forming a closed electrical resistance heating circuit. The heating circuit may terminate with a pair of cold leads 16 for connection to an external power and/or control circuitry not shown. The heating element 12 is formed to produce generally a hollow axially elongated cylinder 14 having an outside surface 18 and an inside surface 20. The elements 12 may be formed in axially elongated spaced apart rows. This can be accomplished by bending the element in two parallel rows 22 as shown in FIG. 4 or in single rows 24 as shown in FIG. 3. The heating element of FIGS. 1, 2 and 3 illustrates a cartridge type heater having both conductors within one housing 12A while FIG. 4 illustrates a Calrod type heater. It is believed that the cartridge type heater is the preferred embodiment because only one end 12B of element 12 has to be brought out of the torque tube 26 as opposed to both ends 12B and 12C for the Calrod type as shown in FIG. 4. Furthermore, this is a good configuration for allowing for the expansion and contraction of the heating element due to its heating and subsequent cooling. It is readily apparent in FIG. 3 that this configuration could be adapted for the Calrod type heater by extending the end 12C as shown by 12D. Also the configuration of FIG. 4 could be adapted for use with a cartridge heater by terminating end 12C at point 12E. Alternately the element 12 may be formed in a spiral or helix for either a cartridge or Calrod type. FIG. 5 shows a helix configuration for a Calrod type. The heater 10 is adapted to fit within the torque tube 26 of an aircraft brake assembly. The heater 10, when activated will produce heat which will be transferred to the torque tube. The torque tube 26 may have openings 26A in which the heat generated by the heater 10 will also pass directly to the brake stack 44. The heater 10 may also have a heat shield means 28 which is adapted to fit within it. The heat shield and the heater elements 12 may be bonded together. The heat shield 28 may also have openings 28B which allow for the passage of air.

Figure 6:
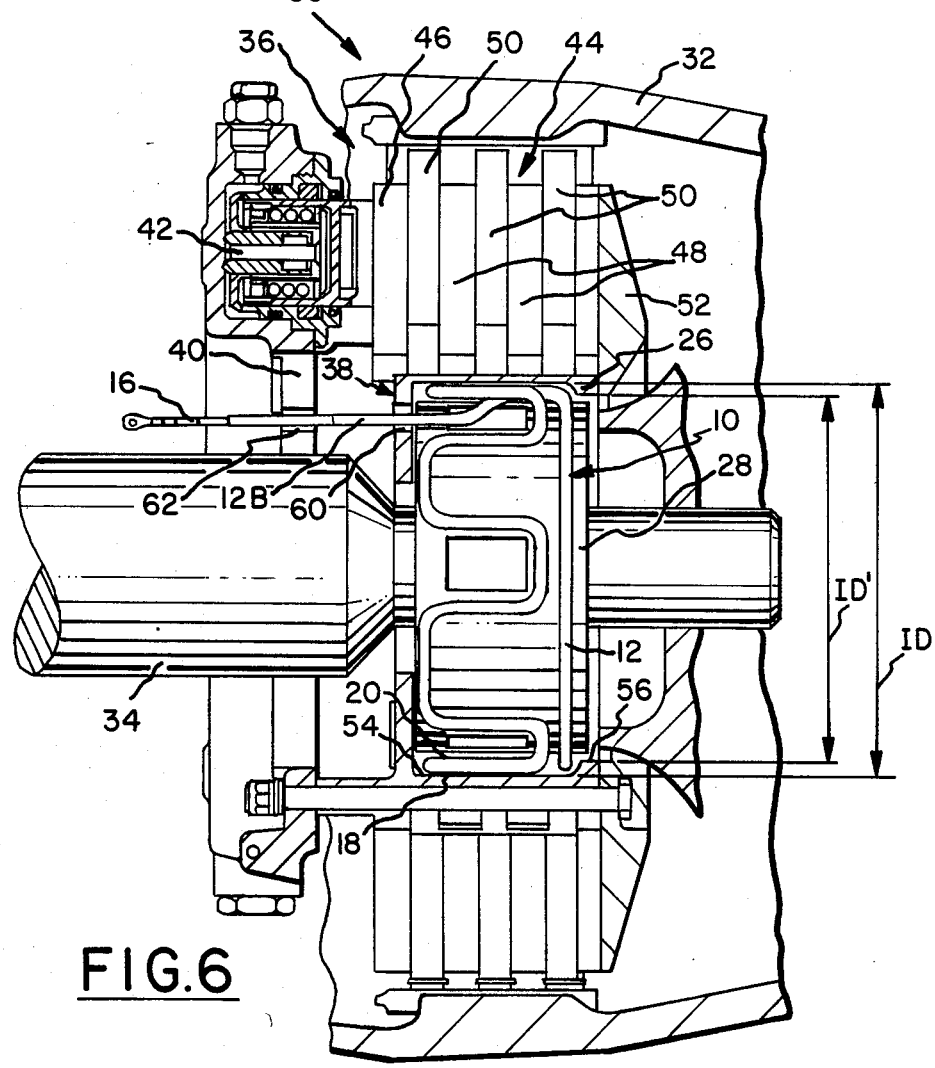
FIG. 6 is a sectional elevation of a portion of a conventional aircraft wheel and brake assembly with the invention incorporated therein.

Now referring to FIG. 6 of the drawings, an improved aircraft brake assembly is illustrated having the heater 10 of FIGS. 1, 2 and 3 incorporated therein. Reference numeral 30 indicates a typical aircraft wheel and brake assembly. The wheel 32 is mounted for rotation about an axle 34. A multi-disk brake assembly 36 may be mounted within the cavity formed by the wheel 32. The brake assembly 30 comprises a torque tube assembly 38 brake housing 40, actuating means 42 and a brake stack 44 including a pressure plate 46, stationary members 48 keyed to the torque tube assembly 38 and rotating members 50 keyed to the wheel 32. The torque tube assembly 38 may be of a unit construction or a multi-piece construction including a torque tube 26 and a back plate 52. The heater 10 fits within the cavity formed by the torque tube 26 such that the outside surface 18 abuts the inner surface 54 of the torque tube 26. The OD of the heater being approximately equal to the ID of the torque tube 26. However, the heater may be required to be compressed to a smaller diameter, such as ID' in order to be inserted through a lip 56 on the torque tube and then return to its original OD. The heat shield means 28 fits within the cavity formed by the heater and may abut its inner surface 20. At least one end 12B of the heating element 12 passes through the heat shield means 28 and through an opening in the torque tube 60 and the brake housing 62. The conductors terminate with cold conductors 16 for connection to external power and control wiring, not shown. The openings 60 and 62 may in some cases be an existing bolt hole if a bolt can be removed without degradation of the integrity of the wheel and brake assembly 30.

A temperature controller, utilizing a thermocouple (not shown) may be used for the activation of the heating unit. Various temperature sensing means are currently used to sense the brake temperature for other purposes and could be used to control the heater. Upon activation, the heater 10 will conduct electricity thereby generating heat. The heat will be transferred to the torque tube assembly 38, which will in turn be transferred to the pressure plate 46 and the stationary and rotating members 48, 50. The heater should be deactivated at a predetermined temperature as stated above These descriptions and details have been shown for the purpose of illustrating this invention and it will become apparent to those skilled in the art that various changes and/or modifications may be made therein without departing from the original spirit or scope of the invention.

We claim:

1. An aircraft brake assembly comprising a brake housing; a brake stack including a pressure plate, at least one rotating member and at least one stationary member to provide braking to such rotating member; a torque tube assembly attached to said housing and substantially forming an axially-longated, hollow cylinder having an outside and an inside surface with such stationary member keyed to said outside surface and a back plate attached to one end of said torque tube; an electric resistance heating means, including a heating element having an electric resistance heating conductor, sheathed over its entire length by an axially elongated housing, said heating element substantially forming an annular, hollow, axially-elongated cylinder having an inside and an outside diameter, said heating means fitting within the hollow portion of said torque tube such that said outside diameter engages the inside surface of said torque tube for generating heat therein when subjected to a voltage source, and transferring a portion of said generated heat through the torque tube to the brake stack to prevent said brake stack from freezing; and a heat shield means forming substantially a hollow, axially-elongated cylinder adapted to fit within said hollow portion formed by said heating means for providing thermal insulation and substantially reflecting said generated heat away from said heat shield means and toward said brake stack.

2. The heater of claim 1 further comprised by a bonding means for securing said heating element to said heat shield means.

3. The assembly of claim 1 wherein said heating means is further comprised by said element being formed in axially elongated spaced rows.

4. The assembly of claim 3 further comprising a thermostat controller means for energizing said heating means at a predetermined temperature and to de-energize said heating means at a different predetermined temperature.

5. The assembly of claim 1 wherein said heating means is further comprised by said heating element forming a helix.

6. The assembly of claim 5 further comprising a thermostat controller means for energizing said heating means at a predetermined temperature and to de-energize said heating means at a different predetermined temperature.

7. The method of heating an aircraft brake assembly comprising a brake housing; a brake stack including a pressure plate, at least one rotating member and at least one stationary member to provide braking to such rotating member; a torque tube assembly attached to said housing and substantially forming an axially-elongated, hollow cylinder having an outside and an inside surface with such stationary member keyed to said outside surface and a back plate attached to one end of said torque tube comprising the steps of:

(a) energizing an electric resistance heating means at a predetermined temperature to generate heat, said heating means including an electric resistance heating conductor, sheathed over its entire length by an axially-elongated housing, said heating element substantially forming an annular, hollow, axially-elongated cylinder having an inside and an outside diameter, said heating means fitting within the hollow portion of said torque tube such that said outside diameter engages the inside surface of said torque tube;

(b) reflecting said generated heat away from a heat shield means and towards said brake stack, said heat shield means forming substantially a hollow axially-elongated cylinder adapted to fit with said hollow portion formed by said heating means; and (c) heating said brake stack by transferring said generated and reflected heat through said torque tube assembly.

8. The method of claim 7 further comprising the step of de-energizing said electric resistance circuit at another predetermined temperature or upon landing.

9. The method of claim 8 wherein step (b) further includes a portion of said generated heat passing through holes in said torque tube for heating directly said brake stack.

* * * * *